United States Patent
Singh

(10) Patent No.: US 11,644,386 B2
(45) Date of Patent: May 9, 2023

(54) TIRE WEAR STATE ESTIMATION SYSTEM AND METHOD

(71) Applicant: The Goodyear Tire & Rubber Company, Akron, OH (US)

(72) Inventor: Kanwar Bharat Singh, Lorenztweiler (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 728 days.

(21) Appl. No.: 16/583,887

(22) Filed: Sep. 26, 2019

(65) Prior Publication Data
US 2020/0182746 A1    Jun. 11, 2020

Related U.S. Application Data

(60) Provisional application No. 62/777,794, filed on Dec. 11, 2018.

(51) Int. Cl.
*G01M 17/02* (2006.01)
*H04W 4/80* (2018.01)
(Continued)

(52) U.S. Cl.
CPC ............. *G01M 17/02* (2013.01); *B60C 11/24* (2013.01); *B60C 11/246* (2013.01); *G01P 15/18* (2013.01);
(Continued)

(58) Field of Classification Search
CPC ...... G01M 17/02; G01P 15/18; B60C 11/246; H04W 4/80
(Continued)

(56) References Cited

U.S. PATENT DOCUMENTS 3,563,088 A   2/1971  Sperberg
6,076,035 A   6/2000  Yanase
(Continued)

FOREIGN PATENT DOCUMENTS

DE   10200505247       5/2007
DE   102005052476 A1   5/2007
(Continued)

OTHER PUBLICATIONS

Caragea ("Logistic Regression", Dept. of Computer Science and Engineering, University of North Texas, Jun. 22, 2016. Accessed from www.cs.uic.edu/~cornelia/kdsin16/lectures/ml6.pdf6/14/22) (Year: 2016).*

(Continued)

*Primary Examiner* — David Z Huang
*Assistant Examiner* — Jean F Morello
(74) *Attorney, Agent, or Firm* — Edward T. Kennedy

(57) ABSTRACT

A tire wear state estimation system includes a CAN bus system disposed on a vehicle. A tire supporting the vehicle is mounted on a wheel. A wheel sensor unit is mounted on a structure adjacent the wheel, and the wheel sensor unit includes a longitudinal acceleration sensor to generate a longitudinal acceleration signal. The wheel sensor unit also includes a vertical acceleration sensor to generate a vertical acceleration signal, and transmission means to communicate the longitudinal acceleration signal and the vertical acceleration signal to the CAN bus system. A processor receives the longitudinal acceleration signal and the vertical acceleration signal. An extractor extracts a tire translational mode from the longitudinal acceleration signal and a tire vertical mode from the vertical acceleration signal. The tire translational mode and the tire vertical mode are input into a classifier to generate a wear state estimation for the tire. A method is also provided.

20 Claims, 5 Drawing Sheets

(51) Int. Cl.
*B60C 11/24* (2006.01)
*G01P 15/18* (2013.01)
*H04L 12/40* (2006.01)

(52) U.S. Cl.
CPC .............. *H04L 12/40* (2013.01); *H04W 4/80* (2018.02); *H04L 2012/40215* (2013.01); *H04L 2012/40273* (2013.01)

(58) Field of Classification Search
USPC .......................................................... 73/146
See application file for complete search history.

(56) References Cited

U.S. PATENT DOCUMENTS

| | | | |
|---|---|---|---|
| 6,278,361 | B1 | 8/2001 | Magiawala et al. |
| 6,912,896 | B2 | 7/2005 | Levy et al. |
| 7,320,246 | B2 | 1/2008 | Schick et al. |
| 7,483,794 | B2 | 1/2009 | Bocquillon et al. |
| 8,061,191 | B2 | 11/2011 | Hanatsuka |
| 8,794,058 | B2 | 8/2014 | Bigot et al. |
| 8,849,500 | B2 | 9/2014 | Gokyu et al. |
| 8,886,395 | B2 | 11/2014 | Singh et al. |
| 8,983,716 | B2 | 3/2015 | Singh et al. |
| 8,983,749 | B1 | 3/2015 | Singh |
| 9,050,864 | B2 | 6/2015 | Singh et al. |
| 9,050,865 | B2 | 6/2015 | Kammann |
| 9,259,976 | B2 | 2/2016 | Singh et al. |
| 9,376,118 | B2 | 6/2016 | Benedict et al. |
| 9,428,013 | B2 | 8/2016 | Singh et al. |
| 9,442,045 | B2 | 9/2016 | Singh |
| 9,513,192 | B2 | 12/2016 | Kretschmann et al. |
| 9,541,419 | B2 | 1/2017 | Borghesani |
| 9,566,834 | B2 | 2/2017 | Kandler et al. |
| 9,610,810 | B1 | 4/2017 | Singh |
| 9,639,882 | B2 | 5/2017 | Gokyu et al. |
| 9,650,053 | B2 | 5/2017 | Singh et al. |
| 9,663,115 | B2 | 5/2017 | Singh |
| 9,669,664 | B2 | 6/2017 | Kretschmann |
| 9,719,886 | B2 | 8/2017 | Luk et al. |
| 9,739,689 | B2 | 8/2017 | Singh |
| 9,752,962 | B2 | 9/2017 | Singh |
| 9,764,603 | B2 | 9/2017 | Lehmann et al. |
| 9,821,611 | B2 | 11/2017 | Singh |
| 9,873,293 | B2 | 1/2018 | Singh et al. |
| 9,878,721 | B2 | 1/2018 | Singh et al. |
| 9,921,134 | B2 | 3/2018 | Unterreiner et al. |
| 10,603,962 | B2 | 3/2020 | Singh |
| 10,794,983 | B1* | 10/2020 | Chandail ............... H04W 4/029 |
| 2003/0144785 | A1 | 7/2003 | Brachert et al. |
| 2006/0114107 | A1 | 6/2006 | Kim et al. |
| 2006/0156790 | A1 | 7/2006 | Bocquillon et al. |
| 2007/0093972 | A1 | 4/2007 | Desai et al. |
| 2010/0238007 | A1 | 9/2010 | Kikuchi et al. |
| 2012/0029759 | A1 | 2/2012 | Suh et al. |
| 2012/0254077 | A1* | 10/2012 | Porikli ............... G06N 20/10 706/12 |
| 2014/0114558 | A1 | 4/2014 | Singh et al. |
| 2014/0278040 | A1 | 9/2014 | Singh et al. |
| 2015/0034222 | A1 | 2/2015 | Martin |
| 2015/0040656 | A1 | 2/2015 | Singh et al. |
| 2015/0057877 | A1 | 2/2015 | Singh |
| 2015/0057951 | A1 | 2/2015 | Stalnaker et al. |
| 2015/0174967 | A1 | 6/2015 | Lehmann et al. |
| 2015/0284006 | A1 | 10/2015 | Singh |
| 2016/0033367 | A1 | 2/2016 | Unterreiner et al. |
| 2016/0129737 | A1 | 5/2016 | Singh et al. |
| 2016/0146706 | A1 | 5/2016 | Singh |
| 2016/0247329 | A1 | 8/2016 | Lavoie |
| 2016/0250899 | A1 | 9/2016 | Takahashi et al. |
| 2017/0001482 | A1 | 1/2017 | De Ruijter |
| 2017/0278314 | A1 | 9/2017 | Laskey et al. |
| 2018/0003593 | A1 | 1/2018 | Siegel et al. |
| 2018/0154707 | A1 | 6/2018 | Singh et al. |
| 2018/0157963 | A1* | 6/2018 | Salti ................... G01S 19/14 |
| 2018/0272813 | A1 | 9/2018 | Singh |
| 2019/0001757 | A1 | 1/2019 | Singh |
| 2019/0270347 | A1 | 9/2019 | Stewart et al. |

FOREIGN PATENT DOCUMENTS

| | | |
|---|---|---|
| EP | 1106397 A2 | 6/2001 |
| EP | 2172760 A1 | 4/2010 |
| EP | 2813378 A1 | 12/2014 |
| EP | 2927065 A1 | 10/2015 |
| EP | 3028909 A1 | 6/2016 |
| EP | 2982521 B1 | 7/2017 |
| EP | 3279013 | 2/2018 |
| EP | 3330106 B1 | 1/2020 |
| WO | 2013015780 A1 | 1/2013 |
| WO | 2015076197 A1 | 5/2015 |
| WO | 2016198591 A1 | 12/2016 |
| WO | 2017156213 A1 | 9/2017 |
| WO | 2017156216 A1 | 9/2017 |

OTHER PUBLICATIONS

CANwireless: wifi and Bluetooth for the CAN bus (ifm, www.ifm.com/obj/ifm-CR3130-CANwireless-wifi-Bluetooth-e-16-17.pdf; published Nov. 2016, accessed Jun. 13, 2022) (Year: 2016).*

Chatti, et al., Estimating the Effects of Pavement Condition on Vehicle Operating Costs, Estimating the Effects of Pavement Condition on Vehicle Operating Costs, 2012.

Le Maitre, et al., Evaluation of Tire Wear Performance, Developments in Tire, Wheel, Steering, and Suspension Technology, Feb. 23, 1998, SAE International.

Logan Woodworth, How Tire Pressure Impacts Treadwear, How Tire Pressure Impacts Treadwear, Aug. 23, 2011, Tire Rack.

Nordstrom, et al., Modelling Tyre Consumption, Modelling Tyre Consumption, Feb. 28, 1996.

Veith, The Driving Severity Number (DSN)—A Step Toward Quantifying Treadwear Test Conditions, The Driving Severity Number (DSN)—A Step Toward Quantifying Treadwear Test Conditions, 1986, vol. 14, No. 3.

Veith, Tire Treadwear—The Joint Influence of Compound Properties and Environmental Factors, Tire Treadwear—The Joint Influence of Compound Properties and Environmental Factors, 1995, vol. 23, No. 4.

* cited by examiner

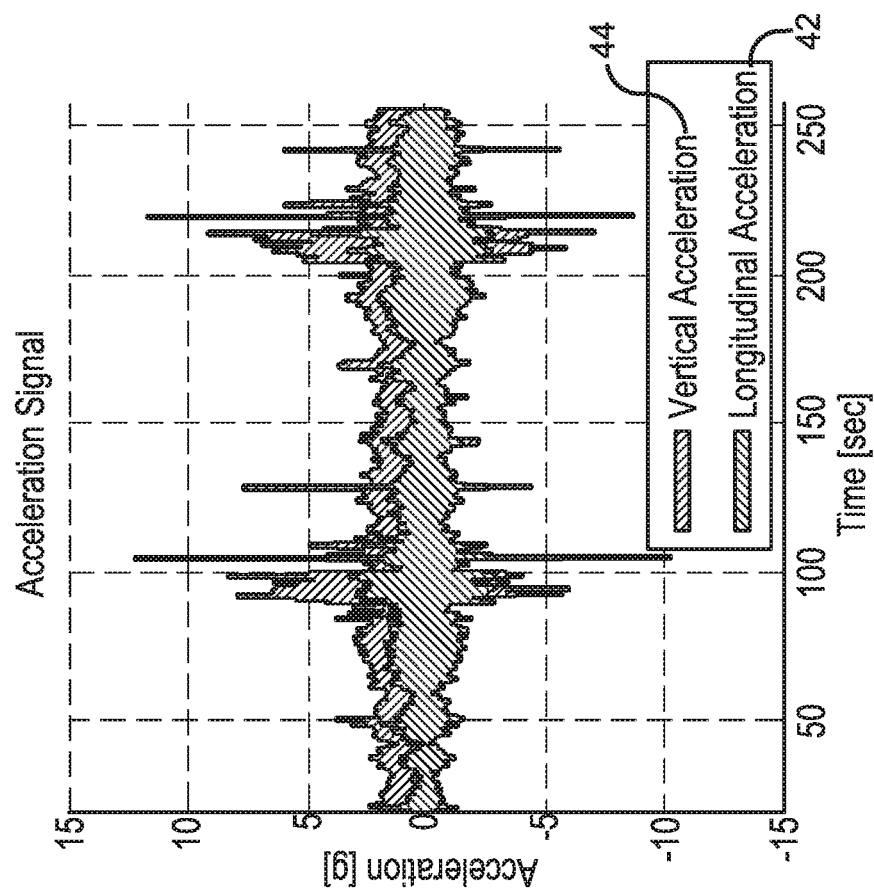
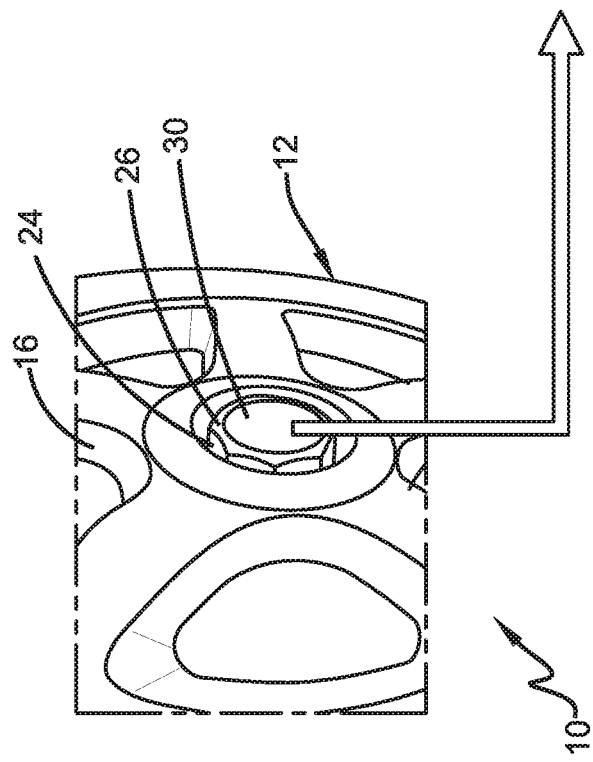
Figure 4a
Figure 4b

TIRE WEAR STATE ESTIMATION SYSTEM AND METHOD

FIELD OF THE INVENTION

The invention relates generally to tire monitoring systems. More particularly, the invention relates to systems that predict tire wear. Specifically, the invention is directed to a system and method for estimating tire wear state based upon longitudinal acceleration and vertical acceleration of the wheel on which the tire is mounted.

BACKGROUND OF THE INVENTION

Tire wear plays an important role in vehicle factors such as safety, reliability, and performance. Tread wear, which refers to the loss of material from the tread of the tire, directly affects such vehicle factors. As a result, it is desirable to monitor and/or measure the amount of tread wear experienced by a tire, which is indicated as the tire wear state. It is to be understood that for the purpose of convenience, the terms "tread wear" and "tire wear" may be used interchangeably.

One approach to the monitoring and/or measurement of tread wear has been through the use of wear sensors disposed in the tire tread, which has been referred to a direct method or approach. The direct approach to measuring tire wear from tire-mounted sensors has multiple challenges. Placing the sensors in an uncured or "green" tire to then be cured at high temperatures may cause damage to the wear sensors. In addition, sensor durability can prove to be an issue in meeting the millions of cycles requirement for tires. Moreover, wear sensors in a direct measurement approach must be small enough not to cause any uniformity problems as the tire rotates at high speeds. Finally, wear sensors can be expensive and add significantly to the cost of the tire.

Due to such challenges, alternative approaches have been developed, which involve prediction of tread wear over the life of the tire, including indirect estimations of the tire wear state. These alternative approaches have experienced certain disadvantages in the prior art due to a lack of optimum prediction techniques, which reduces the accuracy and/or reliability of the tread wear predictions. For example, many such techniques involve data or information that is not easily obtained, such as non-standard vehicle system signals, or data that is not accurate under all driving conditions.

As a result, there is a need in the art for a system and method that accurately and reliably estimates tire wear state using easily obtained and accurate parameters.

SUMMARY OF THE INVENTION

According to an aspect of an exemplary embodiment of the invention, a tire wear state estimation system is provided. The system includes a CAN bus system disposed on a vehicle, and a processor in electronic communication with the CAN bus system. A tire supporting the vehicle is mounted on a wheel, and a wheel sensor unit is mounted on the wheel or on a structure adjacent the wheel. The wheel sensor unit includes a longitudinal acceleration sensor to measure a longitudinal acceleration of the wheel and generate a longitudinal acceleration signal. The wheel sensor unit also includes a vertical acceleration sensor to measure a vertical acceleration of the wheel and generate a vertical acceleration signal, and transmission means to communicate the longitudinal acceleration signal and the vertical acceleration signal to the CAN bus system. The processor receives the longitudinal acceleration signal and the vertical acceleration signal. An extractor is employed by the processor and executes an extraction technique to extract a tire translational mode from the longitudinal acceleration signal, and a tire vertical mode from the vertical acceleration signal. A classifier is also employed by the processor, in which the tire translational mode and the tire vertical mode are input into the classifier to generate a wear state estimation for the tire.

According to another aspect of an exemplary embodiment of the invention, a method for estimating the wear state of a tire supporting a vehicle and being mounted on a wheel is provided. The method includes mounting a wheel sensor unit on the wheel or on a structure adjacent the wheel, and measuring a longitudinal acceleration of the wheel and generating a longitudinal acceleration signal with the wheel sensor unit. A vertical acceleration of the wheel is also measured with the wheel sensor unit and a vertical acceleration signal is generated. The longitudinal acceleration signal and the vertical acceleration signal are transmitted to a CAN bus system disposed on the vehicle, and the longitudinal acceleration signal and the vertical acceleration signal are received in a processor that is in electronic communication with the CAN bus system. A tire translational mode is extracted from the longitudinal acceleration signal, and a tire vertical mode is extracted from the vertical acceleration signal. The tire translational mode and the tire vertical mode are input into a classifier, and a wear state estimation for the tire is generated from the tire translational mode and the tire vertical mode with the classifier.

BRIEF DESCRIPTION OF THE DRAWINGS

The invention will be described by way of example and with reference to the accompanying drawings, in which:

FIG. 4a is a schematic elevational view of a portion of the wheel and tire shown in FIG. 2;

FIG. 4b is a graphical representation of signals from a sensor unit of an exemplary embodiment of the tire wear state estimation system of the present invention;

Similar numerals refer to similar parts throughout the drawings.

Definitions

"ANN" or "artificial neural network" is an adaptive tool for non-linear statistical data modeling that changes its structure based on external or internal information that flows through a network during a learning phase. ANN neural networks are non-linear statistical data modeling tools used to model complex relationships between inputs and outputs or to find patterns in data.

"Axial" and "axially" means lines or directions that are parallel to the axis of rotation of the tire.

"CAN bus" is an abbreviation for controller area network.

"Circumferential" means lines or directions extending along the perimeter of the surface of the annular tread perpendicular to the axial direction.

"Equatorial centerplane (CP)" means the plane perpendicular to the tire's axis of rotation and passing through the center of the tread.

"Footprint" means the contact patch or area of contact created by the tire tread with a flat surface as the tire rotates or rolls.

"Inboard side" means the side of the tire nearest the vehicle when the tire is mounted on a wheel and the wheel is mounted on the vehicle.

"Lateral" means an axial direction.

"Outboard side" means the side of the tire farthest away from the vehicle when the tire is mounted on a wheel and the wheel is mounted on the vehicle.

"Piezoelectric film sensor" a device in the form of a film body that uses the piezoelectric effect actuated by a bending of the film body to measure pressure, acceleration, strain or force by converting them to an electrical charge.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Tread element" or "traction element" means a rib or a block element defined by a shape having adjacent grooves.

DETAILED DESCRIPTION OF THE INVENTION

With reference to FIGS. 1 through 7, an exemplary embodiment of the tire wear state estimation system of the present invention is indicated at 10. The tire wear state estimation system 10 and accompanying method attempts to overcome the challenges posed by prior art methods that measure the tire wear state through direct sensor measurements. As such, the subject system and method is referred herein as an "indirect" wear sensing system and method that estimates wear state. The prior art direct approach to measuring tire wear from tire-mounted sensors has multiple challenges, which are described above. The tire wear estimation state system 10 and accompanying method utilize an indirect approach and avoid the problems attendant use of tire wear sensors mounted directly to the tire tread.

Figure 1:
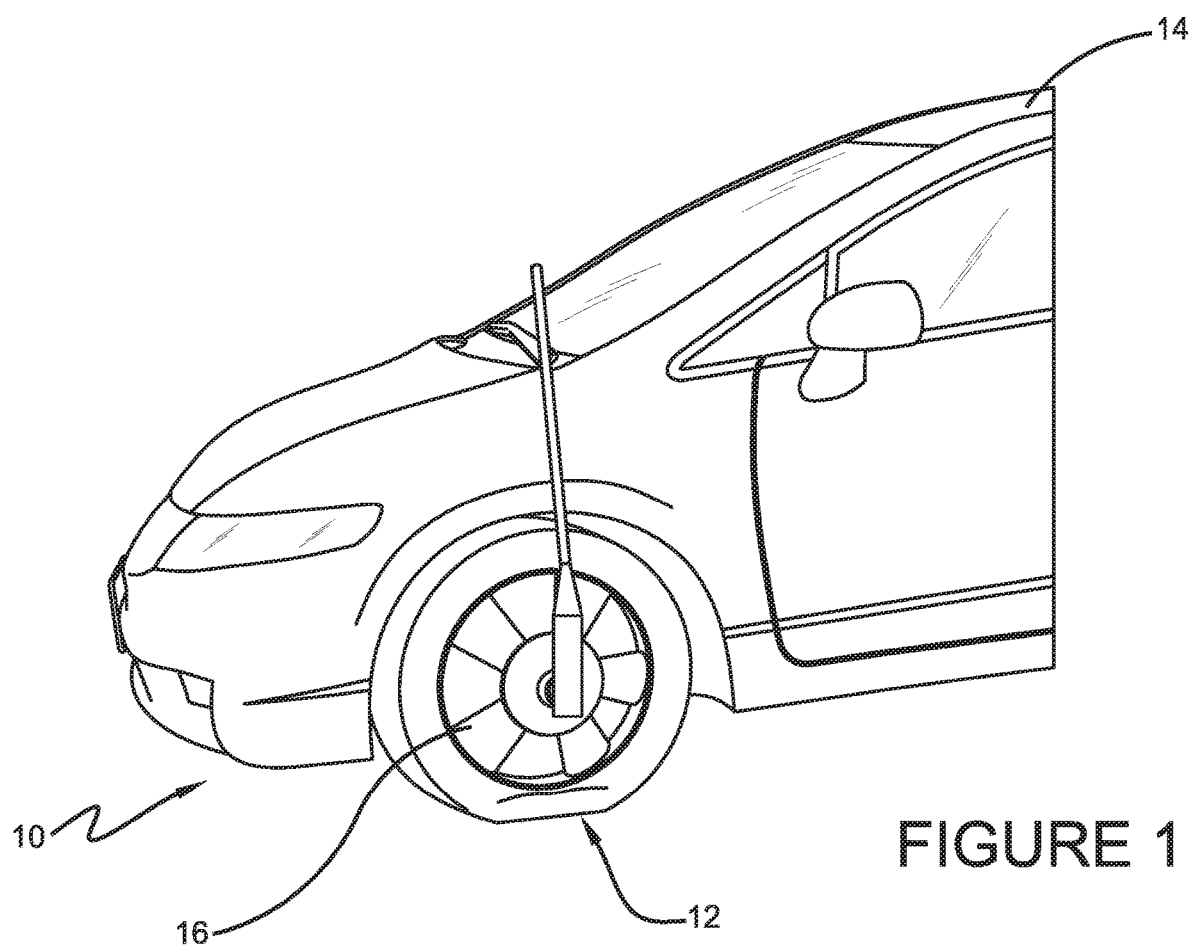
FIG. 1 is a schematic perspective view of a portion of a vehicle that includes a wheel and tire employing an exemplary embodiment of the tire wear state estimation system of the present invention.
Figure 2:
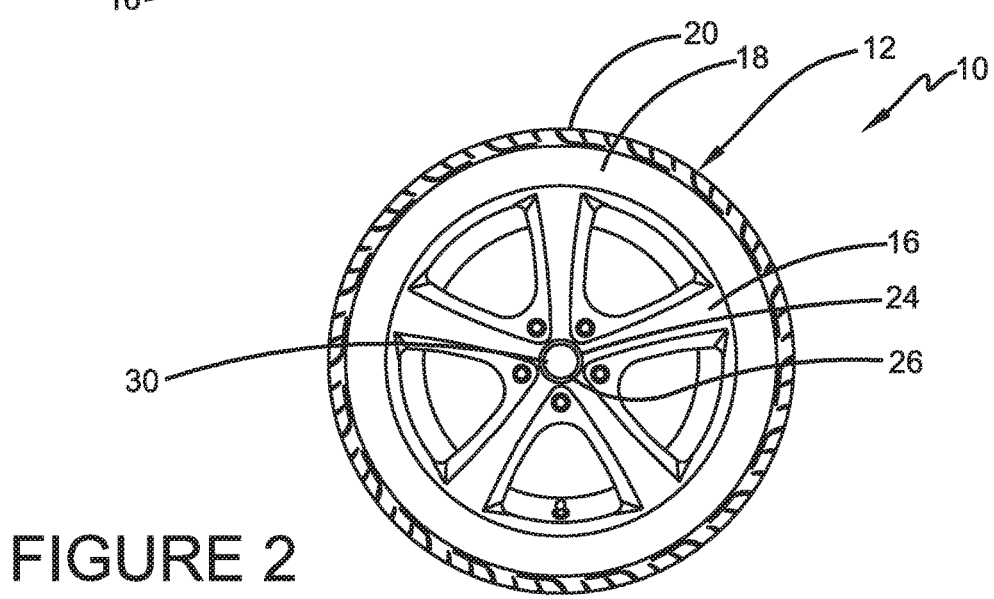
FIG. 2 is a schematic elevational view of the wheel and tire shown in FIG. 1.

With particular reference to FIGS. 1 and 2, the system 10 estimates the tread wear on each tire 12 supporting a vehicle 14. While the vehicle 14 is depicted as a passenger car, the invention is not to be so restricted. The principles of the invention find application in other vehicle categories, such as commercial trucks, in which vehicles may be supported by more or fewer tires.

The tires 12 are of conventional construction, and each tire is mounted on a respective wheel 16 as known to those skilled in the art. Each tire 12 includes a pair of sidewalls 18 (only one shown) that extend to a circumferential tread 20, which wears with age from road abrasion. Each tire 12 may be equipped with a sensor or transducer (not shown) that is mounted to the tire for the purpose of detecting certain real-time tire parameters, such as tire pressure and temperature. Each wheel 16 is rotatably mounted on a respective hub 24 in a manner known to those skilled in the art.

Figure 3:
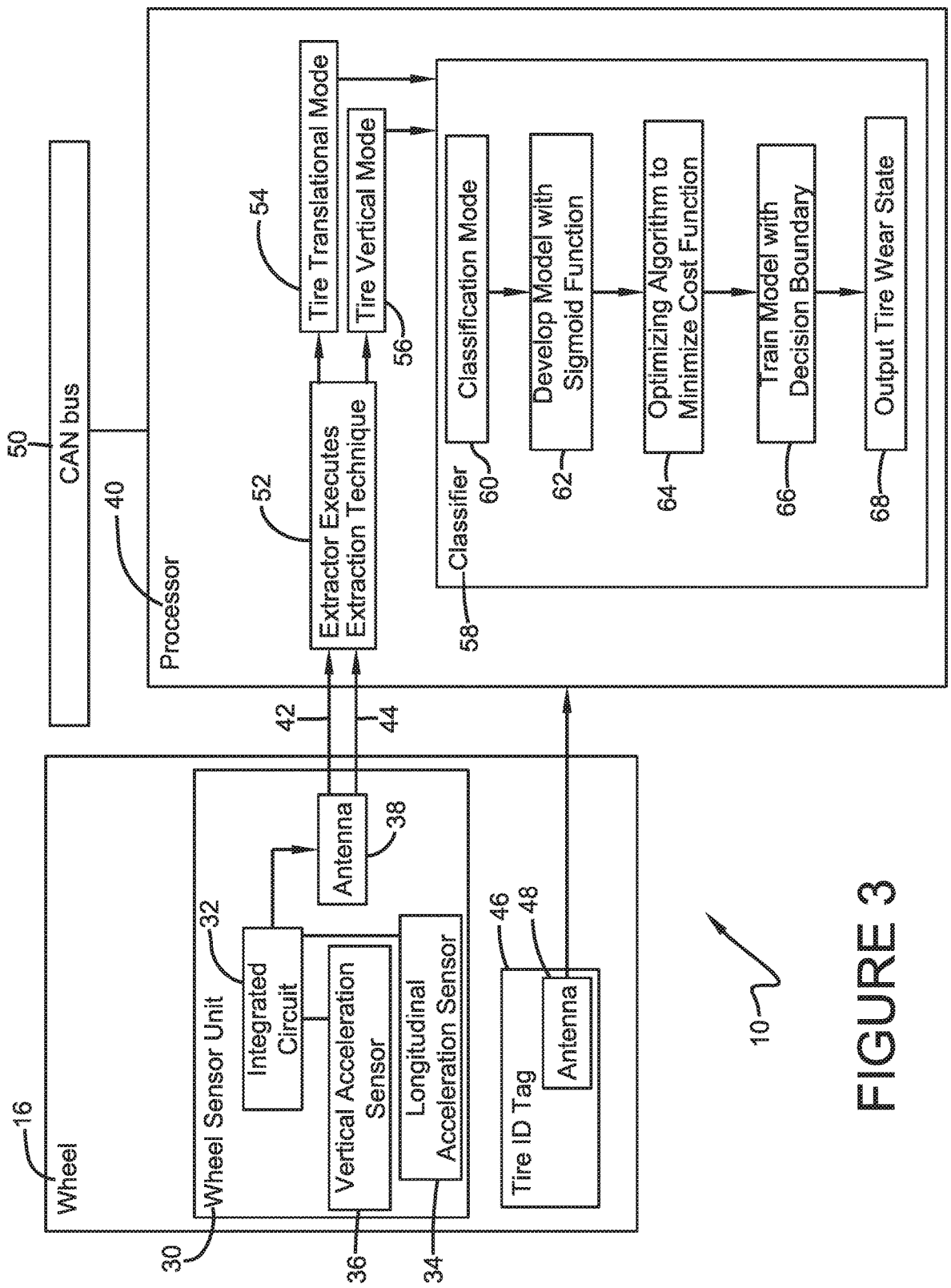
FIG. 3 is a schematic diagram of aspects of an exemplary embodiment of the tire wear state estimation system of the present invention.
Figure 5:
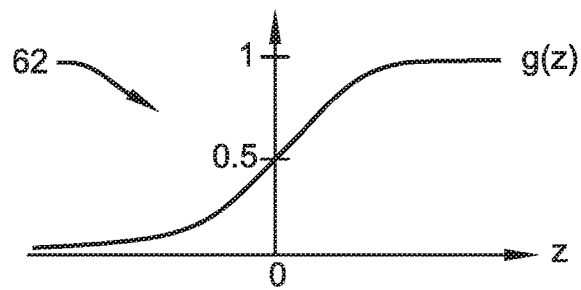
FIG. 5 is a graphical representation of a sigmoid function of an exemplary embodiment of the tire wear state estimation system of the present invention.

A wheel sensor unit 30 is affixed to each respective wheel 16 or on a structure adjacent the wheel. For example, the wheel sensor unit 30 may be rigidly mounted on an outboard end 26 of the hub 24. Referring now to FIGS. 3, 4a and 4b, the wheel sensor unit 30 preferably includes an integrated circuit 32 that in turn includes a processor and memory. The wheel sensor unit 30 also includes at least two sensors 34 and 36, to be described in greater detail below, and an antenna 38. The antenna 38 transmits data from the wheel sensor unit 30 to a remote processor or reader 40 through a wireless connection, such as radio frequency (RF) or a Bluetooth® connection, which will be described in greater detail below. The antenna 38 and sensors 34 and 36 are electrically connected to the integrated circuit 32, and may be carried on a substrate with the integrated circuit in the wheel sensor unit 30.

The sensors in the wheel sensor unit 30 include a longitudinal acceleration sensor or accelerometer 34 to measure longitudinal acceleration of the wheel 16 and generate a longitudinal acceleration signal 42. The sensors in the wheel sensor unit 30 also include a vertical acceleration sensor or accelerometer 36 to measure a vertical acceleration of the wheel 16 and generate a vertical acceleration signal 44. The longitudinal acceleration sensor 34 and the vertical acceleration sensor 36 may be separate units or may be integrated into a single unit within the wheel sensor unit 30. In addition, the wheel sensor unit 30 may include other sensors, such as a temperature sensor, a vibration sensor, a force sensor, and/or a strain sensor.

The integrated circuit 32 of the wheel end sensor 30 may include identification (ID) information for the tire 12 that is mounted on the wheel 16. Alternatively, a separate unit, referred to as a tire ID tag 46, may include ID information for the tire 12 and have an antenna 48 for wireless communication through radio frequency (RF) or a Bluetooth® connection with the wheel end sensor unit 30 and/or the remote processor 40. The tire ID information may include manufacturing information for the tire 12, such as: the tire type; tire model; size information, such as rim size, width, and outer diameter; manufacturing location; manufacturing date; a treadcap code that includes or correlates to a compound identification; and a mold code that includes or correlates to a tread structure identification. The tire ID information may also include a service history or other information to identify specific features and parameters of each tire 12, as well as mechanical characteristics of the tire, such as cornering parameters, spring rate, load-inflation relationship, and the like.

Such tire identification enables correlation of the data measured by the wheel sensor unit 30 with the specific tire 12. The tire ID data and the data measured by the wheel sensor unit 30, including the longitudinal acceleration signal 42 and the vertical acceleration signal 44, is transmitted to the remote processor 40, which may be a processor that is electronically connected to or integrated into the vehicle CAN bus 50, for analysis.

Aspects of the tire wear state estimation system 10 preferably are executed on the processor 40 that is accessible through the vehicle CAN bus 50, which enables input of data from the wheel sensor unit 30 and execution of specific algorithms, to be described below, which are stored in a suitable storage medium and are also in electronic communication with the processor. Rather than a direct estimate of tire wear, the tire wear state estimation system 10 focuses on analyzing the longitudinal acceleration signal 42 and the vertical acceleration signal 44 of the wheel 16 on which the tire 12 is mounted.

Thus, the wheel sensor unit 30 measures the longitudinal acceleration and the vertical acceleration and transmits the measured longitudinal acceleration signal 42 and vertical acceleration signal 44 to the processor 40 in the CAN bus system 50. The processor 40 receives the longitudinal acceleration signal 42 and the vertical acceleration signal 44, focusing on the in-plane wheel acceleration signals, that is, the X and Z planes. An extractor 52 executes an extraction technique, such as a Fast Fourier Transform, to extract a tire translational mode 54 from the longitudinal acceleration signal 42 and to extract a tire vertical mode 56 from the vertical acceleration signal 44. The tire translational mode 54 and the tire vertical mode 56 are then input into a classifier 58 that employs a classification model 60.

With continuing reference to FIG. 3, the classification model 60 of the classifier 58 is employed because the tire wear state estimation system 10 does not employ tire pressure as an input, thereby enabling the system to be economical and easy to implement. More particularly, tire pressure values typically are measured by a TPMS sensor, which is a separate sensor mounted in or to the tire 12. In order to provide system that does not involve the cost or complexity associated with multiple sensors disposed in different vehicle components, the tire wear state estimation system 10 eliminates pressure input from a TPMS sensor. However, not using tire inflation pressure as a variable impacts performance of a wear prediction model, as tire pressure has been observed to be a statistically significant variable for tire wear. Thus, in order for the tire wear state estimation system 10 to be accurate and reliable without an input of tire inflation pressure, the system employs the classifier 58 and the classification model 60.

Preferably, the classification model 60 of the classifier 58 is a binary classification algorithm. As mentioned above, the tire translational mode 54 and the tire vertical mode 56 are input into the classifier 58 and thus the binary classification algorithm 60. To develop the binary classification algorithm 60, a worn tire with a value of 0 is compared to a new tire with a value of 1. Based on this, the classifier 58 must output values between 0 and 1. To satisfy this property, a hypothesis representation is done using a sigmoid function 62, shown in FIG. 5.

Figure 6A:
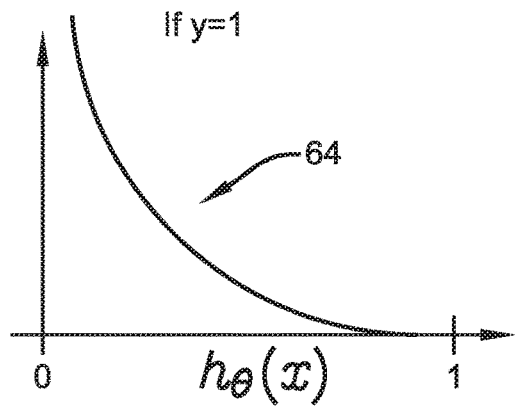
FIG. 6a is a graphical representation of a convex logistic regression cost function at y=1 of an exemplary embodiment of the tire wear state estimation system of the present invention.
Figure 6B:
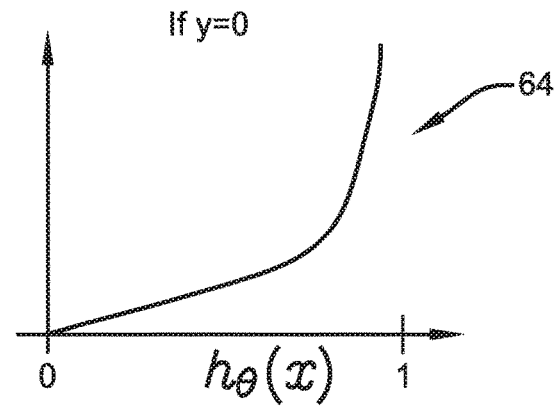
FIG. 6b is a graphical representation of a convex logistic regression cost function at y=0 of an exemplary embodiment of the tire wear state estimation system of the present invention.

A convex logistic regression cost function 64 as shown in FIGS. 6a and 6b is used to capture the premise that, if $h_\theta(x)=0$ (predict P $(y=1|x; \theta)=0$), but $y=1$, this will penalize the learning algorithm with a significant cost:

$$\text{Cost}(h_\theta(x), y) = \begin{cases} -\log(h_\theta(x)) & \text{if } y = 1 \\ -\log(1 - h_\theta(x)) & \text{if } y = 0 \end{cases}$$

FIG. 6a shows the cost function 64 at y=1, and FIG. 6b shows the cost function at y=0. Therefore, the cost function 64 for the θ parameters can be defined as:

$$J(\theta) = -\frac{1}{m}\left[\sum_{i=1}^{m} y^{(i)}\log h_\theta(x^{(i)}) + (1 - y^{(i)})\log(1 - h_\theta(x^{(i)}))\right]$$

An optimizing algorithm 64 is then used to minimize the cost function 64. Preferably, a gradient descent is used as the optimizing algorithm 64. Of course, other techniques to minimize the cost function 64 may be employed.

Figure 7:
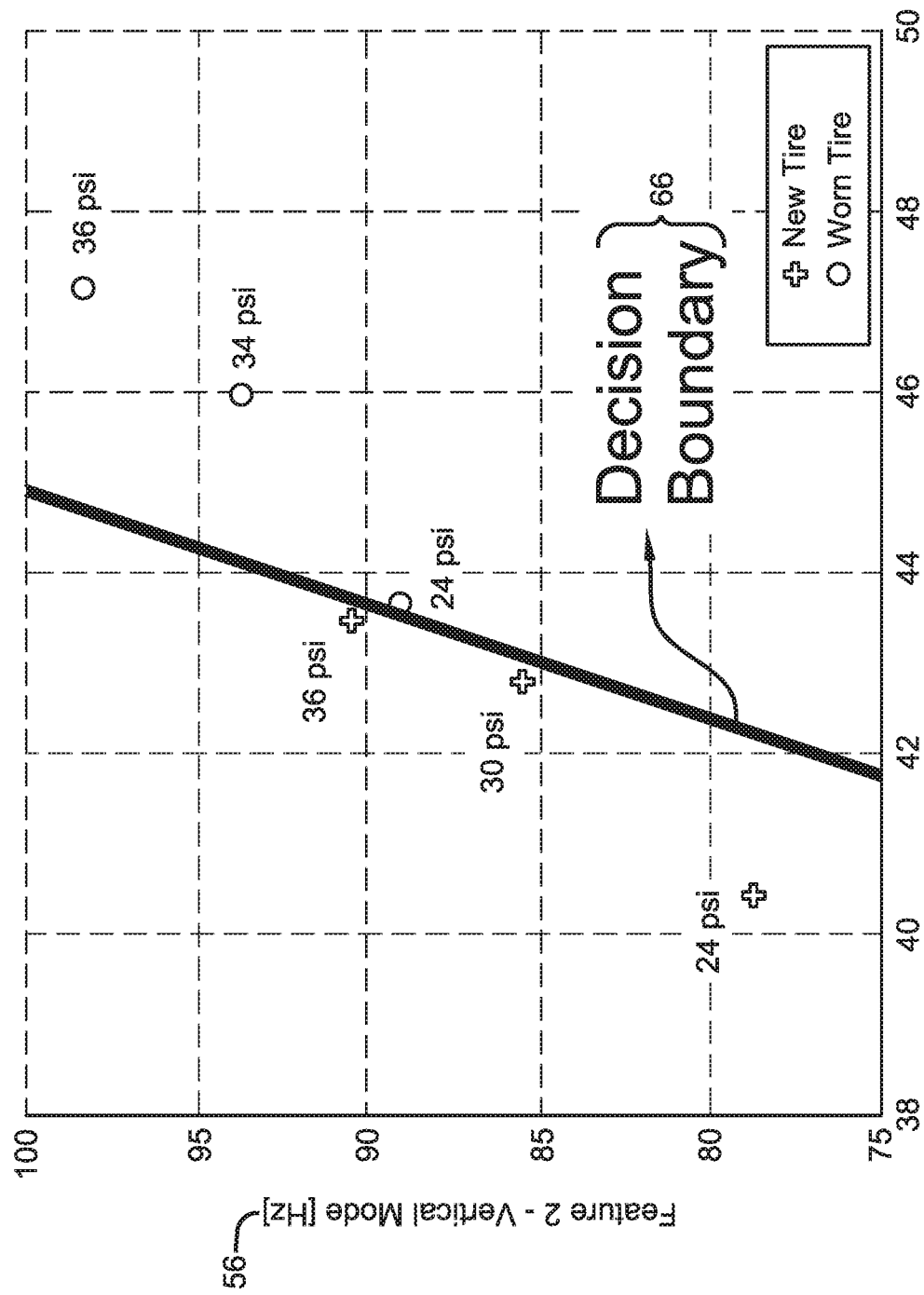
FIG. 7 is a graphical representation of a decision boundary of an exemplary embodiment of the tire wear state estimation system of the present invention.

The classification model 60 is trained with a decision boundary 66, shown in FIG. 7 and represented as:

$$h_\theta(x) = \frac{1}{1 + e^{-\theta^T x}}$$

Where x1=1 (Intercept term), x2=Translational Mode 54 and x3=Vertical Mode 56. Based on optimization, the following model parameters are obtained: θ1=226.630448; θ2=−6.986470; and θ3=0.871756.

A tire wear state estimation 68 is output from the classification model 60 and the classifier 58. The processor 40 preferably correlates the tire wear state estimation 68 to the tire identification information sent from the wheel sensor unit 30 and/or the tire ID tag 46, thereby enabling identification of the specific tire 12 for which the wear state estimation has been generated. Because of the electronic connection between the processor 40 and the vehicle CAN bus 50, the wear state estimation 68 may be communicated from the classifier 58 to other control systems of the vehicle 14, such as an anti-lock braking system (ABS) and/or an electronic stability control system (ESC), to improve performance of such systems.

In addition, the tire wear state estimation 68 may be compared in the processor 40 to a predetermined wear limit. If the wear state estimation 68 is below the limit of acceptable remaining depth of the tread 20, a notice may be transmitted through the vehicle CAN bus 50 to a display that is visible to an operator of the vehicle 14 and/or to a hand-held device, such as an operator's smartphone. The tire wear state estimation system 10 thus may provide notice or a recommendation to a vehicle operator that one or more tires 12 are worn and should to be replaced.

In this manner, the tire wear state estimation system 10 of the present invention estimates the wear state of the tire 12 by monitoring the longitudinal acceleration and the vertical acceleration of the wheel 16 on which the tire is mounted, employing a wheel sensor unit 30. The system 10 uses such easily obtained and accurate parameters to extract the tire translational mode 54 and the tire vertical mode 56, which are input into a classifier 58 to provide an accurate and reliable estimation of the tire wear state 58.

The present invention also includes a method of estimating the wear state of a tire 12. The method includes steps in accordance with the description that is presented above and shown in FIGS. 1 through 7.

It is to be understood that the structure and method of the above-described tire wear state estimation system may be altered or rearranged, or components or steps known to those skilled in the art omitted or added, without affecting the overall concept or operation of the invention.

The invention has been described with reference to a preferred embodiment. Potential modifications and alterations will occur to others upon a reading and understanding of this description. It is to be understood that all such modifications and alterations are included in the scope of the invention as set forth in the appended claims, or the equivalents thereof.

What is claimed is:

1. A tire wear state estimation system comprising:
 a CAN bus system disposed on a vehicle;
 a processor in electronic communication with the CAN bus system;

a tire supporting the vehicle and being mounted on a wheel;

a wheel sensor unit being mounted on the wheel or on a structure adjacent the wheel;

the wheel sensor unit including a longitudinal acceleration sensor to measure a longitudinal acceleration of the wheel and generate a longitudinal acceleration signal;

the wheel sensor unit including a vertical acceleration sensor to measure a vertical acceleration of the wheel and generate a vertical acceleration signal;

the wheel sensor unit including transmission means to communicate the longitudinal acceleration signal and the vertical acceleration signal to the CAN bus system;

the processor receiving the longitudinal acceleration signal and the vertical acceleration signal;

an extractor employed by the processor and executing an extraction technique to extract a tire translational mode from the longitudinal acceleration signal, and to extract a tire vertical mode from the vertical acceleration signal; and a classifier employed by the processor, wherein the tire translational mode and the tire vertical mode are input into the classifier to generate a wear state estimation for the tire, and wherein the tire wear state estimation system is free of a tire pressure measurement and a tire pressure estimation.

2. The tire wear state estimation system of claim 1, wherein the wheel sensor unit is rigidly mounted on an outboard end of a hub on which the wheel is mounted.

3. The tire wear state estimation system of claim 1, wherein the transmission means include an antenna.

4. The tire wear state estimation system of claim 3, wherein the wheel sensor unit transmits measured data from the sensors to the CAN bus system through at least one of radio frequency and Bluetooth® wireless communication.

5. The tire wear state estimation system of claim 1, wherein the wheel sensor unit includes an integrated circuit on which identification information for the tire is stored, and the identification information is communicated to the CAN bus system.

6. The tire wear state estimation system of claim 5, wherein the processor correlates the tire wear state estimation to the tire identification information.

7. The tire wear state estimation system of claim 1, wherein identification information for the tire is stored on an ID tag, and the identification information is communicated to the CAN bus system.

8. The tire wear state estimation system of claim 7, wherein the processor correlates the tire wear state estimation to the tire identification information.

9. The tire wear state estimation system of claim 1, wherein the classifier employs a classification model.

10. The tire wear state estimation system of claim 9, wherein the classification model includes a binary classification algorithm.

11. The tire wear state estimation system of claim 10, wherein the binary classification algorithm is developed with a sigmoid function.

12. The tire wear state estimation system of claim 10, wherein a cost function of the binary classification algorithm is minimized with an optimizing algorithm.

13. The tire wear state estimation system of claim 12, wherein the optimizing algorithm includes a gradient descent.

14. The tire wear state estimation system of claim 9, wherein the classification model is trained with a decision boundary.

15. The tire wear state estimation system of claim 1, wherein the tire wear state estimation is communicated to control systems of the vehicle through the CAN bus system.

16. The tire wear state estimation system of claim 1, wherein a notice is transmitted through the CAN bus system to a display that is visible to an operator of the vehicle when the tire wear state estimation is below a limit of acceptable remaining depth of a tread of the tire.

17. A method for estimating the wear state of a tire supporting a vehicle and being mounted on a wheel, the method comprising the steps of:

mounting a wheel sensor unit on the wheel or on a structure adjacent the wheel;

measuring a longitudinal acceleration of the wheel and generating a longitudinal acceleration signal with the wheel sensor unit;

measuring a vertical acceleration of the wheel and generating a vertical acceleration signal with the wheel sensor unit;

transmitting the longitudinal acceleration signal and the vertical acceleration signal to a CAN bus system disposed on the vehicle;

receiving the longitudinal acceleration signal and the vertical acceleration signal in a processor in electronic communication with the CAN bus system;

extracting a tire translational mode from the longitudinal acceleration signal, and extracting a tire vertical mode from the vertical acceleration signal;

inputting the tire translational mode and the tire vertical mode into a classifier; and generating a wear state estimation for the tire from the tire translational mode and the tire vertical mode with the classifier, wherein the method for estimating the wear state of a tire is free of a tire pressure measurement and a tire pressure estimation.

18. The method for estimating the wear state of a tire of claim 17, further comprising the step of correlating the tire wear state estimation to tire identification information.

19. The method for estimating the wear state of a tire of claim 17, wherein the step of generating the wear state estimation for the tire from the tire translational mode and the tire vertical mode with the classifier includes employing a classification model.

20. The method for estimating the wear state of a tire of claim 19, further comprising the step of training the classification model with a decision boundary.

* * * * *